Inventor:
Adelfried Steinhausen
By: Spencer & Kaye
ATTORNEYS

Aug. 8, 1967      A. STEINHAUSEN      3,334,538
SEQUENTIAL TIME DELAY DISPLAY DEVICE
Filed May 6, 1963      4 Sheets-Sheet 3

Inventor:
Adelfried Steinhausen
By: Spencer & Kaye
ATTORNEYS

Aug. 8, 1967  A. STEINHAUSEN  3,334,538
SEQUENTIAL TIME DELAY DISPLAY DEVICE
Filed May 6, 1963

INVENTOR
Adelfried Steinhausen
BY Spencer & Kaye
ATTORNEYS

United States Patent Office 3,334,538
Patented Aug. 8, 1967

3,334,538
SEQUENTIAL TIME DELAY DISPLAY DEVICE
Adelfried Steinhausen, Garching, near Munich, Germany, assignor to Institut für Plasmaphysik G.m.b.H., Munich-Garching, Germany
Filed May 6, 1963, Ser. No. 278,385
Claims priority, application Germany, May 4, 1962, J 21,720
9 Claims. (Cl. 88—14)

The present invention relates generally to the art of displaying the distribution of energy, and, more particularly, to a method and a device for displaying how rapidly changing energy is distributed, this energy in its first approximation being linear and being of the type which is propagated during a certain short time interval and with a certain speed.

Up to now, in order to illustrate how substantially one-dimensional rapidly changing energy is distributed, arrangements such as a slit or slot image or the like have been used. Since such slits are elongated and approach a one-dimensional line, they may be considered to be one-dimensional.

In a known arrangement, the image of the energy which passes through the slit is reproduced onto a photographic layer which is quickly moved during the time interval of observation, this movement being at a right angle to the slit image. In this manner a two-dimensional image is obtained, since the one-dimensional line image is moved at right angles to itself so that each point along the line may be thought of as being expanded at a right angle to the longitudinal length of this line. In this manner a two-dimensional image is obtained having one coordinate which represents the intensity of the distribution of energy in the longiudinal direction, for example, the longitudinal direction of the slit, and another coordinate which represents the changes of the energy of a certain point of the slit. Similar results can be obtained using revolving mirror cameras and the like. Although these methods have the advantage of providing a high picture resolution, the application is limited due to the mechanically moving parts which are used and the limited sensivity of the photographic layer. Furthermore, these methods are poorly suited to the continuous surveillance of processes of short duration which are repeated periodically.

Purely electrically operating devices have been used in the past for illustrating process which proceed rapidly and which, for example, contain an image tube or the types of storage elements used in television camera. These types of storage arrangements, however, respond slowly and thus are not suited for extremely rapidly proceeding processes; but, in the case of image tubes, the resolution is approximately inversely proportional to the amplification factor which may be obtained, that is, the resolution capability decreases with the intensity of the primary energy.

With these defects of the prior art in mind, it is a main object of the present invention to provide a method and apparatus for displaying how rapidly changing energy is distributed which energy changes during a very short time interval and which is approximately linear, that is, in its first approximation it is substantially one-dimensional and wherein the above-mentioned disadvantages of the prior art are to a great extent eliminated.

Another object of the invention is to provide a device of the type described wherein the display of energy is more accurate and may be obtained immediately and in a simpler manner than previously.

These objects and others ancillary thereto are accomplished according to preferred embodiments of the invention wherein the distribution of energy is divided into a number of sections which correspond to the desired resolution. This division is done in the longitudinal direction of the line or in the substantially one-dimensional direction. The energy itself or signals representative of the energy in the sections mentioned above, are successively delayed by time periods which, with respect to the instant to be displayed, increase from section to section by an amount which is at least substantially constant and which is equal to the duration of the time interval during which the energy occurred. Then, the delayed energy of these sections after the delaying process are displayed successively.

In one embodiment of the invention an electron beam may be used for display purposes and which may be deflected in the manner of a television raster across a picture screen. The individual lines of the raster then represent the chronological change of the various sections. The energy of each section is then delayed successively with respect to the other sections by an instant which is at least substantially constant and which is from section to section at least equal to the duration of the time interval plus an amount of time which is needed for the electron beam being deflected across a picture screen to be returned and thus equal to the flyback. The electron beam is modulated with the energy of the individual sections which successively appear and which are spaced from one another with a stepwise delay. The modulation is always done during the forward sweep and the duration is arranged to be substantially equal to the time interval.

In order to render it possible to modulate the electron beam with preferably an intensity modulation, the primary energy or energy to be observed is, at a desired instant, converted into electrical energy. The energy to be observed as well as the electrical energy obtained after the conversion and representative of the energy to be observed can be delayed in the manner described above.

Particularly simple arrangements for performing the method of the present invention may be used if a delay device is incorporated which is constructed from a number of similar delay units, each of which provides a delay having a duration corresponding to the above-mentioned amount. Then, the energy of the individual sections is fed to the delay device in such a manner that the individual sections successively and in correspondence with their energy distribution pass an increasing number of delay units so that the first section passes through no units at all, the second section passes through one, the third passes through two, etc.

The delay of the primary source of energy or of the electrical energy produced therefrom by conversion can be provided by changing the propagation speed of the energy and/or the path to be traversed. Thus, the principle underlying the present invention can be applied to various forms of energy, and the primary source of energy may be, for example, electromagnetic radiation, corpuscular radiation, or, under certain circumstances, also kinetic energy, such as pressure, heat, and sound. Thus, the terms "rapid" and "very short" are to be considered in a relative manner with respect to the form of energy which is involved and its speed of propagation.

The preferred field of application of the present invention is in the representation of radation images and particularly from optical wave radiation.

Additional objects and advantages of the present invention will become apparent upon consideration of the following description when taken in conjunction with the accompanying drawings in which.

Figure 1:
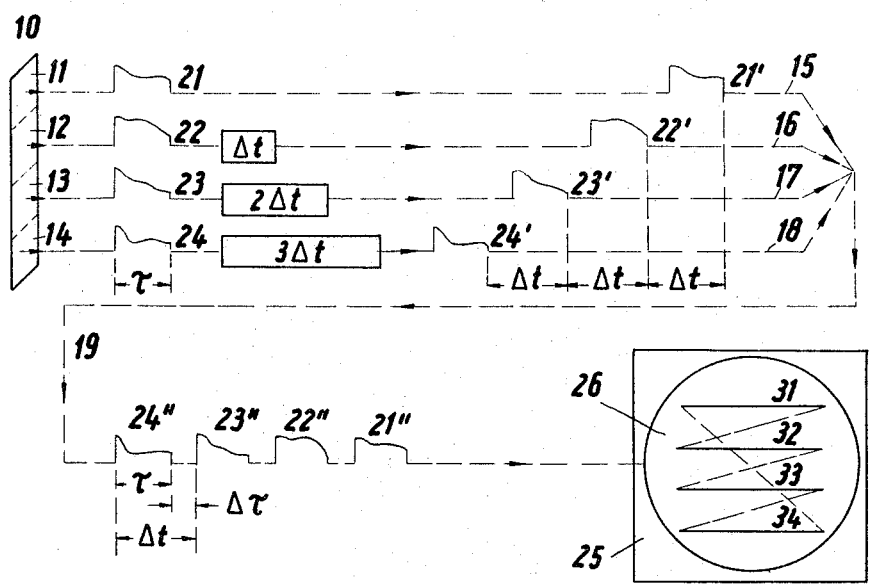
FIGURE 1 is a schematic view illustrating the basic principles of the present invention.

With more particular reference to the drawings, FIGURE 1, on the left side shows a source of energy in the form of a slit or slot 10 which is shown in perspective, and which in its first approximation is linear. For simplification of this illustration it will be assumed that a longitudinal resolution of the slot image into four picture points 11 through 14 is sufficient, the slot itself having a width of one picture point. It shall also be assumed that the source of energy 10 radiates this energy only during a short time interval $\tau$. If the energy source does not by its nature have this property of radiating during only a short time interval, then an appropriate shutter may be provided for this purpose.

These individual object points or picture points 11 through 14 of the distribution of the energy, thus deliver energy pulses 21 through 24, respectively. During the time interval $\tau$ which is the pulse duration, there will be a change in the energy and this change will be separately illustrated for the individual object points 11 through 14. The change of the energy may be its intensity, and with wave radiation or periodic mechanical processes the change may be in the frequency, or with corpuscular radiation it may be the particle energy or density.

The energy pulses 21 through 24, respectively, are now delayed in a stepwise manner by an amount which is preferably at least approximately constant. For example, the pulse 21 is not delayed at all, the pulse 22 is delayed by a time interval $\Delta t$, the pulse 23 is delayed by the time interval $2\Delta t$, and the pulse 24 is delayed by the instant $3\Delta t$. Thus, the energy pulses 21 through 24 which originally occurred simultaneously follow one another after the delaying process by a spacing of $\Delta t$. This spacing timewise is indicated in FIGURE 1 by the pulses 21' through 24' which are illustrated at an instant at which the last pulse 24' has just passed its delay device. Up to this point the energy pulses of the individual section, that is of the object points 11 through 14, have been transmitted in separate channels 15 through 18, respectively. The separate channels are now combined into a single channel 19 which carries the successive pulses shown at 21'' to 24''.

The duration of time $\Delta t$ by which the individual delay times for the various pulses differ from one another should be at least equal to the pulse duration $\tau$, under certain circumstances, an additional predetermined time interval $\Delta \tau$ is added to $\tau$ and the duration of these time periods will be discussed in further detail below.

This train of pulses is then used for modulating an electron beam which is deflected across a picture screen 26 of an oscillograph 25 preferably in a manner of a television raster, wherein the electron beam provides a number of successive lines 31 through 34, disposed one below the other. The time duration of a line is to correspond at least approximately with the pulse duration $\tau$, and the instant $\Delta \tau$ must be at least equal to the time interval which is necessary for the flyback or line return sweep pulse.

The electron beam is preferably intensity modulated so that the brightness along a time base, which is the individual lines, changes in dependence upon the changes of the measured characteristic of the energy distribution which is to be displayed. However, modulation may also comprise a deflection at right angles to the time or line deflection which is then superimposed upon the raster deflection.

In order to carry out the modulation of the electron beam, the source of primary energy 10 must be transformed at some instant into electrical energy in the form of a voltage. This transformation can be carried out before or after the delay as is illustrated by the following examples of specific embodiments.

The method which is described above thus provides a manner of displaying in successive manner, simulaneously occurring changes in the character of a number of object points 11 through 14, without using mechanically moving parts and without using a storage effect. This display can be repeated periodically at intervals which are at least equal to the maximum delay duration, plus the duration of the time interval and the return sweep time, that is, in the preferred embodiment, the raster return sweep time or flyback time.

With more particular reference to FIGURE 2, the first embodiment of a device explained in connection with FIGURE 1 is schematically illustrated. This embodiment is arranged using the assumption that the problem is to measure the character or course of the intensity of a plasma discharge during a certain brief time interval $\tau$ along a representative cross section.

The plasma discharge is produced in vessel 40 which is illustrated only schematically with a slit-like or slot-shaped window 10' arranged so that radiation may emanate from the discharge region to be examined. In the example which will now be disclosed it is assumed that optical radiation is involved in the range between the vacuum ultraviolet and the median infrared. If desired, a narrow region of the spectrum may be isolated from the total radiation of the plasma by means which are known per se.

Figure 2:
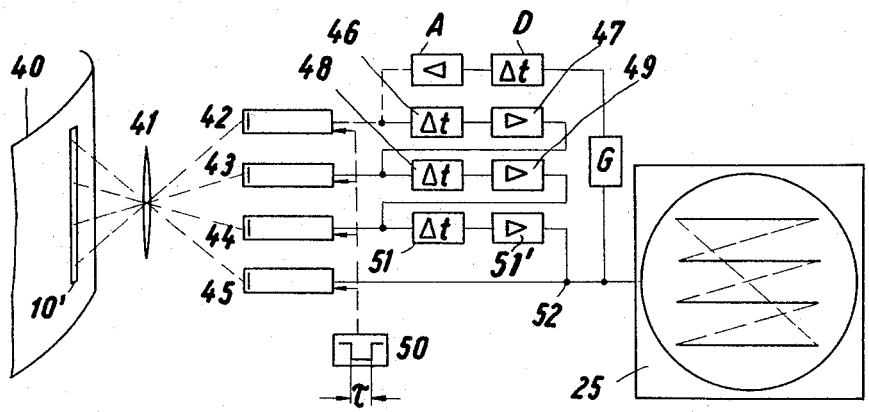
FIGURE 2 is a schematic view illustrating a first embodiment of the present invention wherein the delay is provided after the transducer elements.

The exit window 10' can be considered to be a bright or shining slot and it is projected by means of an optical system 41, shown only schematically in FIGURE 2, onto a number of transducer devices of the photosensitive type, which in the present embodiment are multiplier phototubes 42 through 45. The number of the photosensitive devices which are used depends upon the resolution which is desired in the longitudinal direction of the slot 10'. The output of the first multiplier phototube 42 is connected with the output of the second multiplier phototube 43 by means of a first delay circuit 46, and a first amplifier 47. The output of the second multiplier phototube 43 is in turn connected with the output of the third multiplier phototube 44 by means of a second delay circuit 48 and a second amplifier 49, and this arrangement is continued up to the output of the last multiplier phototube.

In the present embodiment the last tube is a fourth multiplier phototube 45 which is directly connected with the input of an oscillograph 25. The amount of amplification of the amplifiers 47, 49, etc. is arranged so as to compensate for the damping and/or phase relationship of the delay devices 46, 48, etc. connected in series with the amplifiers, as well as to compensate for any differences in the sensitivity of the photosensitive devices.

The actual operation of the embodiment illustrated in FIGURE 2 will be readily understood when considered in conjunction with the explanation of the principles of the invention discussed in connection with FIGURE 1. The division of the approximately linear distribution of energy along the slot 10' is effected by means of the discrete light-sensitive devices 42 through 45. If the energy emission from the slot 10' is not by its nature limited to short definite time intervals, then the instant $\tau$ under consideration is provided by masking the slot by some type of shutter or closure arrangement. For example, a Kerr cell shutter may be provided in the path of optical radiation between the slot 10' and photosensitive devices 42 through 45. Preferably, however, the operative voltage of the photosensitive devices, that is, the operating voltage of the multiplier phototubes 42 through 45, is controlled by means of a pulse source 50 which is schematically shown in FIGURE 2.

In operation, output pulses occur simultaneously at all of the outputs of the photosensitive devices 42 through 45, which output pulses correspond to the intensity of the linear radiation source 10′. The output pulse from the last multiplier phototube 45 appears without any delay at the oscillograph 25. The output pulse of the penultimate photosensitive device 44 first passes through the delay device 51 and then through an amplifier device 51′ and appears at a connection point 52 at a time when the pulse from the photosensitive device 45 has already terminated. The pulses which are delivered by the photosensitive devices 43 and 42 are presented to connection point 52 in a corresponding manner and thus a succession of spaced pulses corresponding to the chain of pulses 21″ to 24″ in FIGURE 1, is delivered to the input of the oscillograph 25.

As in FIGURE 1, the electron beam in the oscillograph 25 is deflected in such a manner that a number of lines disposed one below the other, are formed on the screen. Each of the individual output pulses of the transducer devices 42 through 45, modulates the beam during a forward sweep forming a line. The flyback sweep is carried out during the pause which is the time duration of $\Delta \tau$, indicated in FIGURE 1, and which occurs between two successive pulses. When the intensity of the beam is modulated, the picture on the screen of the oscillograph 25 approximately corresponds to a revolving mirror photograph. The line deflection can be triggered in the usual manner. Also, the delay arrangement may be fed with a pre-pulse for triggering the line deflection.

A series circuit containing a gate circuit G, a delay device D, and an amplifier A, is provided for allowing the train of pulses to pass through the circuit several times when the picture screen is to be visually observed so that, theoretically, unlimited numbers of repetition of the illustration of the single observation time are possible. However, in practice, the train of pulses becomes increasingly distorted with repeated repetitions through the delay arrangement. But, the arrangement still provides advantages in that a visual observation is facilitated with even just a few repetitions and for adjusting operations for the process frequently a less accurate and more quantitative reproduction is sufficient. The number of repetitions of the single observation instant can be controlled by means of gate G which, for example, may contain a counter for ceasing the repetitions when a predetermined number of pulses has passed.

Figure 3:
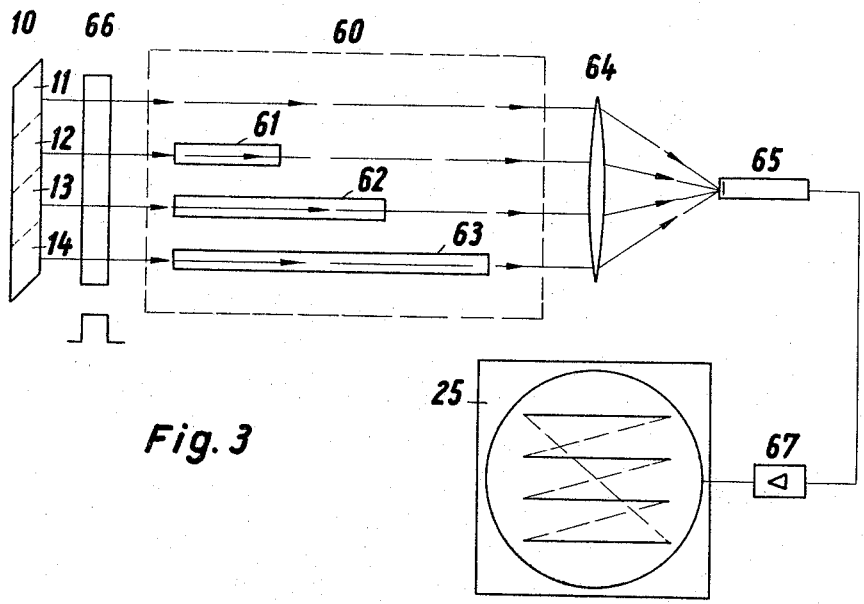
FIGURE 3 is a schematic view of a second embodiment of the invention illustrating an arrangement which provides for a delay before the transducer element.

With more particular reference to the embodiment illustrated in FIGURE 3, a delay of the primary source of energy used for modulating the electron beam is provided instead of a delay of the electrical signal as in the above-disclosed embodiment. In this embodiment also it is assumed that the primary source of energy is optical radiation.

In this embodiment the primary source of radiation emanates from a slot-like source 10 and exits in the form of an at least approximately parallel beam. The radiation then passes through a delay arrangement in which the various sections of the radiation along the slot 10 are delayed by different time intervals. After passing through the delay arrangement, the radiation is focussed upon a single radiation-sensitive transducer 65. Focussing is provided by means of a schematically shown optical system 64. The output of transducer 65 provides a train of pulses which is fed to oscillograph 25. The delay arrangement 60 comprises a number of light-conductive delay paths or photoconductive paths 61 through 63 which may comprise quartz or plastic rods, fiber bundles, tubes, or conduits filled with a highly refracting liquid, etc. The length and/or the index of refraction of these light paths is such that the propagation time from rod to rod increases by a certain amount $\Delta t$. Radiation from the first section 11 of the slot-shaped radiation source 10 arrives directly at the photosensitive device 65 which may be a multiplier phototube. The radiation from section 12 passes through a light conductor 61 which delays the radiation by the time period $\Delta t$. Radiation from section 13 is delayed by the time period $2\Delta t$ by means of the light conductor 62, and the energy from section 14 is delayed by a time period of $3\Delta t$ by means of the light conductor 63. These light conductors 61 through 63 may be bent; for example, they may be coiled and then preferably they would all end directly at the input window of transducer 65.

If a shutter is necessary for use in the embodiment of FIGURE 3, it may be provided in front of the delay arrangement 60, for example, preferably a Kerr cell shutter 66 is used.

The energy from sections 11 through 14 will be dissipated or lessened in different amounts due to the different amounts due to the different paths to be traversed and the different media through which the energy passes. In order to compensate for this change in the energy level, an amplifier 67 having variable amplification is preferably used in the path of the electric signal between transducer 65 and oscillograph 25. The amount of amplification may be increased from pulse to pulse in a stepwise manner. If there is a larger number of sections into which the distribution of energy is divided, it is also possible to replace the stepwise change by a linear change. Then, the amount of amplification of amplifier 67 can simply be controlled in correspondence with the deflection of the electron beam at right angles to the line direction, for example, directly by the raster deflection voltage, or a voltage which is proportional thereto.

Figure 4:
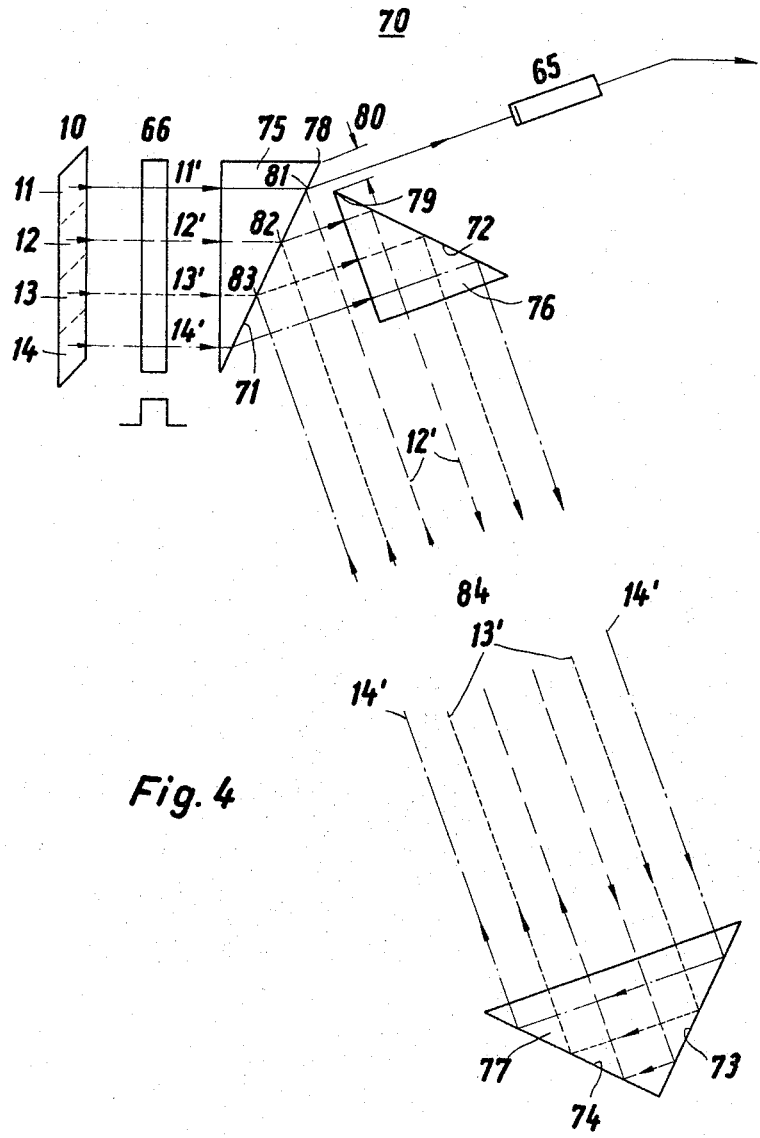
FIGURE 4 is a schematic view of a third embodiment of the invention illustrating another manner of providing a delay before the transducer element.

With more particular reference to FIGURE 4, another embodiment of the invention is shown in which the primary source of energy is optical radiation, and the optical radiation is delayed rather than the electrical signal into which it is later converted. In this respect, the arrangement according to FIGURE 4 is similar to that of FIGURE 2 since the radiation energy of the individual sections does not pass through different individual delay arrangements but rather passes through a successive, increasing number of at least approximately equal delay paths.

It is again assumed that the slot 10 delivers as parallel a bundle of rays as possible and that a subdivision of the slot image into four sections 11 to 14 is sufficient for the resolution desired. The ray may also pass through a Kerr cell shutter 66 if this is necessary and arrives at a delay arrangement 70. The essential elements of the delay arrangement are three prisms 75, 76, and 77 which provide four reflecting surfaces 71, 72, 73, and 74.

The bundle of rays enters the prism 75 preferably at right angles to the surface into which it enters. An inclined surface 71 of this prism is arranged to be reflecting in such a manner that part of the radiation penetrates the surface. Part of the light which reaches the surface 71 is reflected upwardly and is lost to the delay device 70, and the remainder of the light passes through the surface 71 and into the delay arrangement proper. After leaving the prism 75 the rays pass at an angle of 45° with respect to surface 71. If the radiation which enters is not monochromatic, then only a narrow region of the spectrum is transmitted through the prism arrangement. The arrangement may be such that the angle of incidence of the light passing into prism 75 can be varied, and so a particular region of the spectrum can be excluded as desired and thus the arrangement is at the same time effective for providing monochromatic light radiation from non-monochromatic radiation.

The reflecting surfaces 71 and 72 of prisms 75 and 76, respectively, are provided with upper edges 78 and 79, respectively, which are spaced a distance apart equal to the breadth of one section or one object point to be resolved. A portion or space 80 allows a portion of the bundle of light rays coming from the surface 71 and adjacent edge 79 to pass out of the delay arrangement and toward the transducer 65 without passing into prism 76. The light beams from sections 11 through 14 may be considered, for purposes of the present discussion, as single rays 11′ through 14′, respectively. The beam 11′ meets surface 71 at a point 81 and thus is reflected directly to the radiation-sensitive transducer 65 through the region designated 80 in FIGURE 4. The transducer 65 can be a multiplier phototube of the type which is provided in the embodiment of FIGURE 3 and it is connected to an electrical arrangement which is not shown in this figure, but which may be similar to that of FIGURE 3.

The beam 12′ is refracted or bent at point 82 as it leaves the prism 75 and is shown in dashed lines in FIGURE 4. This beam enters prism 76 and is reflected from the prism surface 72 into a transit path 84. At the far end of this transit path, this beam enters prism 77 through the hypotenuse surface thereof, it being noted that the cross section of this prism is a right triangle. The beam is reflected from surface 73 to surface 74 and is reflected out of prism 77 and traverses transit path 84 to again arrive at prism 75. Since the reflection surface 71 of prism 75 is arranged in the transit path 84 displaced by the width of one of the sections 11 to 14, in the direction of the light rays, the beam 12′ does not attain the point which it originally reached on surface 71, i.e. original point 82, but rather comes to the exit point 81 of the beam 11′ which had previously been emitted by the preceding section of the energy to be observed. The beam 12′ is reflected from the point 81 corresponding to the degree of reflection or surface 71 and follows the same path which previously beam 11′ followed and arrives at the radiation-sensitive transducer 65.

Beam 13′ is shown in dotted lines and emanates from section 13 of the slot-shaped energy radiation to be displayed. This beam exits from prism 75 at point 83, passes into the prism 76 and is reflected from surface 72 thereof through the transit path 84 and is reflected from surfaces 73 and 74 of prism 77 to again return to reflecting surface 71. However, it is reflected from point 82 of reflecting surface 71 from which the beam 12′ had originally left the prism 75. At this point, the beam 13′ is reflected toward the right and now follows exactly the same path which beam 12′ had previously followed. Finally, this beam is reflected at point 81 into the radiation-sensitive transducer 65.

It can now be readily seen that analogous conditions are present in the case of beam 14′ and/or other beams which may follow. Beam 14′ after one cycle through the delay device 70 arrives at point 83, after two cycles arrives at point 82, and after three cycles arrives at point 81. Finally, after a triple delay providing three delay time periods, it arrives at the radiation-sensitive transducer 65. Thus, a succession of spaced light pulses or beams arrives at radiation-sensitive transducer 65 and these pulses originated from the successive sections of the linear distribution of the radiation to be displayed.

With each reflection that takes place at the partially light-permeable reflecting surface 71, a loss of light occurs as part of the radiation from transit path 84 enters prism 75 and is lost. Thus, in this arrangement also an amplifier will be used having an amount of amplification which increases stepwise or preferably linearly with respect to time in order to compensate for this loss of light.

The effect of making surface 71 of greater reflecting capability results in a correspondingly smaller amount of radiation entering the delay arrangement through the surface 71. The reflection losses are smaller in those cases when a greater reflection capability is provided. Since the loss when the light enters the delay arrangement occurs only a single time, while the reflection losses multiply, the reflection capability of surface 71 is chosen to be greater as a greater amount of reflection is necessary, for example, when a greater number of picture points are present.

With the use of Kerr cell shutters according to the present state of the art, light pulses having a minimum duration of approximately 20 nanoseconds (one nanosecond equals $10^{-9}$ seconds) can be provided. If a pulse duration of 50 nanoseconds is used as the starting point for time period of the energy, and which time period is more easily controllable and provides pulses of approximately rectangular shape, a length of the light pulse of approximately 15 meters results. This is easily calculated when it is considered that the speed of light is 300,000,000 meters per second and 300,000,000 times 50 times $10^{-9}$ equals 15. If a duration of 50 nanoseconds is also provided for the return sweep or flyback of the electron beam, then about 15 meters will be provided as the spacing of the prisms 75 and 76 from prism 77. Optical arrangements of this order of magnitude may also be provided in a vacuum without difficulty.

The arrangement illustrated in FIGURE 4 requires a collimated beam in order to operate in a trouble-free manner. In order to produce extensively parallel radiation it is already known to use an optical system having a very large focal length. Another arrangement which can only be used for light transmitting measurements is illustrated in FIGURE 5.

Figure 5:
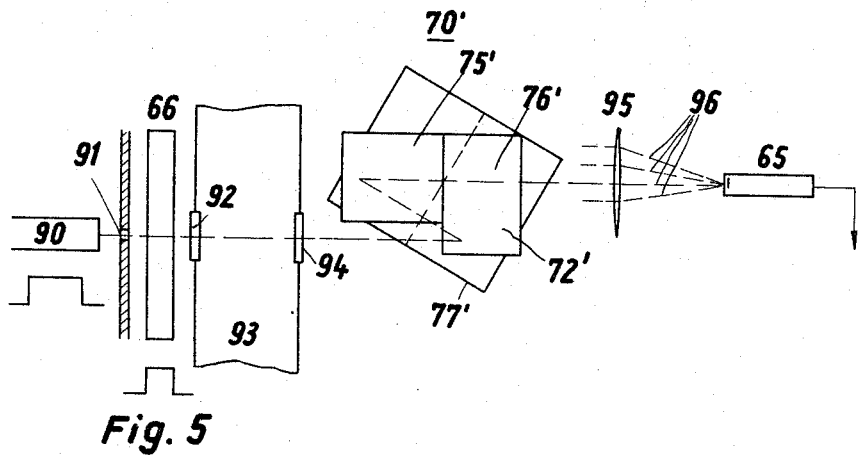
FIGURE 5 is a schematic view of a modified form of FIGURE 4.
Figure 6:
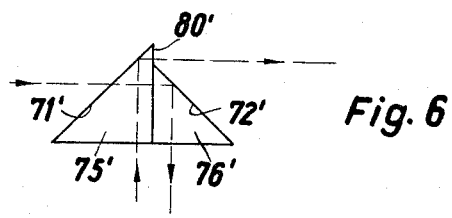
FIGURE 6 is a detailed view of the prisms shown in FIGURE 5.

In this arrangement shown in FIGURES 5 and 6, a laser 90 is used as the light source, and this laser can be pulse operated in a manner which is known per se. The radiation from the laser is monochromatic and collimated and is limited by a slot 91 and enters a housing 93 through an entrance window 92. In the housing 93 a process is occurring which is to be examined on the basis of its absorption variations. The radiation which is so modified then exits from an output window 94 and can then be processed further as shown in FIGURE 4. Thus, exit window 94 takes the place of slot 10 in FIGURE 4.

In FIGURE 5 a modified delay arrangement 70′ is shown wherein the loss of light which the group of rays suffers when penetrating through the inclined surface 71 and when being reflected from this surface is avoided. Prism 75′ in FIGURE 5 is an isosceles right triangle in cross section as is the prism 76′ and the two prisms are arranged in what may be thought of as mirror image relationship so that the two surfaces of the short sides of the prisms abut against each other and they are held against each other in a position which is as accurately aligned as possible.

FIGURE 6 illustrates the prisms 75′ and 76′ from the side. The reflecting surfaces 71′ and 72′ of prisms 75′ and 76′, respectively, are, as in FIGURE 4, displaced with respect to one another by the breadth of a picture point to provide an area 80′ through which the rays reflected from surface 71′ may pass completely free of the prism 76′. As shown in FIGURE 5, the prism 75′ is somewhat displaced laterally with respect to prism 76′ and in the direction of the prism edges so that the rays can enter one of the short sides of the prism 76′ at right angles. The rays are then reflected from surface 72′ in the manner described above and they arrive at the prism 77′. However, the prism 77′ in the embodiment of FIGURES 5 and 6 is somewhat different than in the embodiment of FIGURE 4. In the present embodiment, the prism 77′ is somewhat rotated about an axis which is parallel to the light rays so that although in FIGURE 4 the edges of all three prisms are parallel, in FIGURE 5 the edges of only prisms 75′ and 76′ are parallel, whereas the edges of prism 77′ are disposed at a very small angle therewith. However, the amount of displacement of these edges with respect to each other is small and in FIGURE 5 is shown in a rather exaggerated manner, this displacement being just enough so that the rays reflected from prism 77′ to prism 75′ can enter prism 75′ and pass through the cycles in a manner described above until they finally exit through the surface 80' as shown in FIGURE 6. The edge of prism 77', where the reflecting surfaces thereof meet, thus forms an angle with the incidence direction of the transit path which is a little different than 90°. Due to this displacement of prism 77' the light pulses according to the number of cycles through the device exit from different places along the end surface in the area of 80' as shown by means of dashed lines 96 which indicate the paths of the successive light pulses. The parallel rays 96 are focussed upon a narrowly limited surface of the photocathode of the multiplier 65 by means of a lens arrangement 95 in order to negate the influence of any difference in the sensitivity of the various regions of the photocathode.

The arrangement shown in FIGURE 4 or in FIGURES 5 and 6, can easily be arranged so that the light pulses from a two-dimensional distribution of optical energy may be resolved. It may readily be seen that the delay arrangement 70 of FIGURE 4 operates in the same manner if a light pulse from a two-dimensional rather than from a substantially one-dimensional and linear light source is provided. Light from a two-dimensional planar light source may enter the delay arrangement 70 through the prism surface 71. In this case the only difference is that a succession of band-shaped light pulses will then emanate from the surface 80 which can then be divided in the same manner as the light pulses coming from light source 10 in FIGURE 4. In order to provide resolution of a rectangular image, it thus is only necessary to provide two delay arrangements having transit paths 84 disposed at an angle of 90° with each other. The first delay arrangement then provides strip-like light pulses at such a spacing that they can be resolved by the second delay arrangement in the manner described in connection with FIGURE 4.

Figure 7:
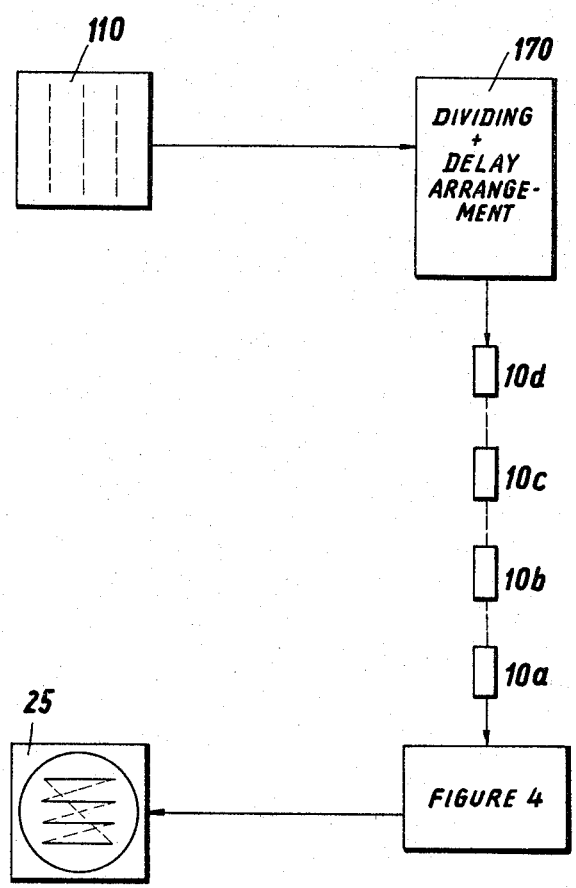
FIGURE 7 is a diagrammatic view of another embodiment wherein display of a two-dimensional energy source may be provided.

Such an embodiment is diagrammatically indicated in FIGURE 7 wherein a two-dimensional distribution of energy 110 is indicated, with dashed lines indicating the manner in which the first division of energy into strips or slot-shaped bands would be provided. Then, assuming that light radiation is involved, the light rays from 110 are divided and delayed in the dividing and delay arrangement 170 which provides a succession of energy strips 10a, 10b, 10c, and 10d which are sufficiently delayed from one another so that each strip may in turn be delayed as discussed above in connection with the FIGURE 4 embodiment for example. Then, these strips 10a through 10d are fed to the FIGURE 4 embodiment in which the process described above in connection with FIGURE 4 is carried out successively for each of the strips in turn. This is then fed to the oscillograph 25 for display purposes.

Although the invention has been explained in connection with a few preferred embodiments, it can be modified in various manners. For example, in the embodiment of FIGURE 2 it is possible to use separate delay lines and separate amplifiers which respectively handle only the signal of one radiation-sensitive device. In FIGURE 4, for example, the transit path 84 may be filled with a medium having a high index of refraction in order to shorten the physical dimensions of such an embodiment. The pulse train could also be displayed during a single transverse deflection of the electron beam even though the resolution and the ease of observing the process of the arrangement would suffer thereby.

Also, the arrangements which have been described are suitable for displaying distribution of energy other than optical energy. For example, in FIGURE 2 instead of the phototube multipliers 42 through 45, other transducer arrangements could be used such as scintillation counters, neutron counter tubes, etc., wherein the slit or slot 10 or 10' delivers other forms of energy. By correspondingly modifying FIGURE 3, other forms of energy can also be delayed differently on the basis of transit time or transit path effects. The distribution of energy does not necessarily have to be even as it is in the illustrated examples.

In FIGURES 2 and 3 the individual photosensitive devices and delay devices i.e. the light conductors 61 through 63 respectively are shown spaced from each other by a certain distance. The linear energy source, i.e. the slot 10 is then sampled at spaced points and energy emerging between said points is lost. This may be permissible in certain circumstances, if not, the photosensitive devices and delay devices are arranged abutting to each other.

If some or all of the pulses which correspond to the energy emerging from a specific section of the source during the time interval to be observed, are displayed one immediately after the other (e.g. during a single line or deflection period of a cathode ray oscilloscope) the mentioned time intervals $\Delta\tau$ between the respective pulses may be omitted.

It will be understood that the above description of the present invention is susceptible to various modifications, changes, and adaptations, and the same are intended to be comprehended within the meaning and range of equivalents of the appended claims.

What is claimed is:

1. A method for displaying how rapidly changing energy is distributed, which energy is substantially one dimensional in a direction transverse to the direction of propagation and is propagated during a certain short time period and with a certain speed, comprising the steps of: dividing, in the substantially one dimensional direction, the linear distribution of energy which appears during such time period into a number of energy sections corresponding to the desired resolution; delaying the energy of the sections successively by intervals which, in relation to the occurrence of the energy during such time period, increase from section to section, the duration between intervals being at least equal to said time period; and displaying the energy of the respectively successively delayed energy sections.

2. A method as defined in claim 1, comprising, after the delaying step, transforming the successive energy sections into an electrical signal.

3. A method for displaying how rapidly changing energy is distributed, which energy is substantially one dimensional in a direction transverse to the direction of propagation and is propagated during a certain short time period and with a certain speed, comprising the steps of: dividing, in the substantially one dimensional direction, the linear distribution of energy which appears during such time period into a number of energy sections corresponding to the desired resolution; transforming the energy sections into a corresponding number of individual electrical signals; delaying the electrical signals successively by intervals which, in relation to the occurrence of the energy during such time period increase from signal to signal, the duration between intervals being at least equal to said time period; and displaying the electrical signals.

4. A method as defined in claim 1 wherein said displaying is accomplished by transforming the energy sections into electrical signals, and applying said signals to an oscillograph for controlling its electron beam.

5. A method as defined in claim 4 wherein said electron beam is caused to scan the oscillograph to form a line picture raster having flyback sweep, and applying said signals to said oscillograph for deflecting the electron beam only during a line scan of the picture raster, and the amount by which the delay times of two adjacent sections differ is equal to the duration of the time interval plus an instant which is at least as long as the flyback sweep for the electron beam.

6. A method for forming a display of a characteristic of a form of rapidly changing energy which is propagated during a certain short time period and with a certain speed, comprising the steps of: masking the energy so that a substantially linear form thereof may be sensed; dividing in its longitudinal direction the linear form into a number of energy sections corresponding to the desired resolution; delaying the energy of the sections successively by intervals which, in relation to the occurrence of the energy during said time period, increase from section to section and the duration between intervals being at least equal to the time period; and displaying the energy of the respectively successively delayed energy sections.

7. A method as defined in claim 4 wherein said electron beam has its intensity modulated by the electric signals.

8. A method as defined in claim 6 wherein the successive delaying of energy sections is performed so that the energy sections are delayed in the same order in which they appear in the linear form.

9. A method as defined in claim 6 wherein the displaying of the energy sections is performed successively.

References Cited

Gloersen, "Electronic-Recording, Time-Resolving Spectrometer," Journal of the Optical Society of America, vol. 48, No. 10, October 1958, pp. 712–716.

JEWELL H. PEDERSEN, *Primary Examiner.*

RONALD L. WIBERT, *Examiner.*